(12) United States Patent
Olivadese et al.

(10) Patent No.: US 11,674,854 B2
(45) Date of Patent: Jun. 13, 2023

(54) MAPPING TEMPERATURE DISTRIBUTION IN SUPERCONDUCTING DEVICES

(71) Applicant: International Business Machines Corporation, Armonk, NY (US)

(72) Inventors: Salvatore Bernardo Olivadese, Stamford, CT (US); Daniela Florentina Bogorin, Syracuse, NY (US); Nicholas Torleiv Bronn, Long Island City, NY (US); Sean Hart, Tarrytown, NY (US); Patryk Gumann, Tarrytown, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 928 days.

(21) Appl. No.: 16/460,457

(22) Filed: Jul. 2, 2019

(65) Prior Publication Data
US 2021/0003456 A1    Jan. 7, 2021

(51) Int. Cl.
*G01K 3/14* (2006.01)
*G06N 10/00* (2022.01)
*G06F 30/20* (2020.01)

(52) U.S. Cl.
CPC ............... *G01K 3/14* (2013.01); *G06F 30/20* (2020.01); *G06N 10/00* (2019.01)

(58) Field of Classification Search
CPC .. G01K 3/14; G01K 7/42; G06F 30/20; G06F 30/367; G06F 2119/08; G06N 10/00
See application file for complete search history.

(56) References Cited

U.S. PATENT DOCUMENTS

| | | |
|---|---|---|
| 4,869,598 A | 9/1989 | McDonald |
| 5,309,117 A | 5/1994 | Cadotte, Jr. et al. |
| 5,818,097 A | 10/1998 | Rohlfing et al. |

(Continued)

FOREIGN PATENT DOCUMENTS

| | | |
|---|---|---|
| JP | 2005-20171 A | 1/2005 |
| WO | 2014135749 | 9/2014 |

(Continued)

OTHER PUBLICATIONS

List of IBM Patents or Applications Treated as Related.
(Continued)

*Primary Examiner* — Robert G Bachner
(74) *Attorney, Agent, or Firm* — Amin, Turocy & Watson, LLP

(57) ABSTRACT

Techniques regarding determining and/or analyzing temperature distributions experienced by quantum computer devices during operation are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a region component that can define a plurality of temperature regions from a quantum computing device layout. The computer executable component can also comprise a map component that can generate a map that characterizes a temperature distribution by determining at least one temperature achieved within the plurality of temperature regions during an operation of the quantum computing device layout.

25 Claims, 15 Drawing Sheets

(56) References Cited

U.S. PATENT DOCUMENTS

| | | | |
|---|---|---|---|
| 9,292,642 | B2 | 3/2016 | Herr et al. |
| 9,383,254 | B1 | 7/2016 | U-Yen et al. |
| 9,523,777 | B2 | 12/2016 | Cecil et al. |
| 10,061,883 | B2 | 8/2018 | Shauck et al. |
| 10,140,404 | B2 | 11/2018 | Rigetti et al. |
| 10,145,743 | B2 | 12/2018 | Timofeev et al. |
| 10,147,865 | B1 | 12/2018 | Tahan |
| 10,706,187 | B1 | 7/2020 | Ehrlund et al. |
| 10,833,652 | B1 | 11/2020 | Olivadese |
| 11,048,846 | B2 | 6/2021 | Solgun |
| 11,281,524 | B1 | 3/2022 | Egger et al. |
| 11,317,519 | B2 | 4/2022 | Abdo et al. |
| 2003/0227349 | A1 | 12/2003 | Matsui et al. |
| 2006/0103583 | A1 | 5/2006 | Kleismit et al. |
| 2010/0304977 | A1 | 12/2010 | Sadleir |
| 2012/0105177 | A1 | 5/2012 | Mclaren et al. |
| 2015/0293236 | A1 | 10/2015 | Cecil et al. |
| 2016/0047763 | A1 | 2/2016 | Omichi et al. |
| 2016/0328512 | A1 | 11/2016 | Chen |
| 2017/0173262 | A1 | 6/2017 | Veltz |
| 2018/0157775 | A1 | 6/2018 | Ronagh et al. |
| 2019/0007051 | A1 | 1/2019 | Sete et al. |
| 2019/0042677 | A1 | 2/2019 | Matsuura et al. |
| 2019/0042966 | A1 | 2/2019 | Hogaboam et al. |
| 2019/0044542 | A1 | 2/2019 | Hogaboam et al. |
| 2020/0120812 | A1 | 4/2020 | Abdo et al. |
| 2020/0202248 | A1 | 6/2020 | Mezzacapo et al. |
| 2020/0411937 | A1 | 12/2020 | Whittaker et al. |
| 2021/0003456 | A1 | 1/2021 | Olivadese et al. |
| 2021/0003457 | A1 | 1/2021 | Olivadese et al. |
| 2021/0013391 | A1 | 1/2021 | Johnson et al. |
| 2021/0057631 | A1 | 2/2021 | Swenson et al. |
| 2021/0190885 | A1 | 6/2021 | Swenson et al. |
| 2021/0257995 | A1 | 8/2021 | Sun et al. |
| 2021/0350268 | A1 | 11/2021 | Whittaker et al. |
| 2022/0101171 | A1 | 3/2022 | Chen |
| 2022/0328747 | A1 | 10/2022 | Griggio et al. |

FOREIGN PATENT DOCUMENTS

| | | |
|---|---|---|
| WO | 2018064535 | 4/2018 |
| WO | 2020/180885 A1 | 9/2020 |

OTHER PUBLICATIONS

Non-Final Office Action received for U.S. Appl. No. 16/460,572 dated May 2, 2022, 56 pages.

Final Office Action received for U.S. Appl. No. 16/460,572 dated Aug. 12, 2022, 24 pages.

International Search Report and Written Opinion for International Application Serial No. PCT/EP2020/068395 dated Oct. 13, 2020, 12 pages.

International Search Report and Written Opinion for International Application Serial No. PCT/EP2020/068402 dated Oct. 14, 2020, 15 pages.

Song et al., "10-qubit entanglement and parallel logic operations with a superconducting circuit", Mar. 30, 2017, 16 pages.

Zajac et al., "Impact of floorplanning and thermal vias placement on temperature in 2D and 3D processors", Microelectronics Journal, vol. 52, Mar. 28, 2016, pp. 40-48.

Frunzio et al., "Fabrication and characterization of superconducting circuit QED devices for quantum computation", Confirmation No. 1357 Session ID 3EI07, Nov. 28, 2004, 4 pages.

Olivadese, et al. "Controlling a Quantum Computing Device Based on Predicted Operation Time." U.S. Appl. No. 16/727,157, filed Dec. 26, 2019. 48 pages.

Devalapalli. "Thermal Activation of Superconducting Josephson Junctions." Massachusetts Institute of Technology (2007). 75 pages.

Yeh et al., "Microwave attenuators for the use with quantum devices below 100mK." Journal of Applied Physics, 121(22), 224501. https://doi.org/10.1063/1.4984894 (2017). 8 pages.

Audley et al., "A prototype kinetic inductance thermometer for X-ray calorimetry." Journal of Low Temperature Physics, 93(3-4), 245-250. https://doi.org/10.1007/bf00693427 (1993). 6 pages.

Rauch et al., "Microwave properties of YBa2Cu3O7-x thin films studied with coplanar transmission line resonators." Journal of Applied Physics, 73(4), 1866-1872. https://doi.org/10.1063/1.353173 (1993). 8 pages.

Meservey et al., "Measurements of the Kinetic Inductance of Superconducting Linear Structures." Journal of Applied Physics, 40(5), 2028-2034. https://doi.org/10.1063/1.1657905 (1969). 8 pages.

Mell, Peter, et al. "The NIST Definition of Cloud Computing." National Institute of Standards and Technology. Sep. 2011. 7 pages.

Hui, et al. "QC—How to build a Quantum Computer with Superconducting Circuit?" Medium.com. https://medium.com/@jonathan_hui/qc-how-to-build-a-quantum-computer-with-superconducting-circuit-4c30b1b296cd. Last Accessed Jun. 5, 2019. 25 pages.

Non Final Office Action received for U.S. Appl. No. 16/460,572 dated Mar. 20, 2023, 22 pages.

1102 — DETERMINING, BY A SYSTEM OPERATIVELY COUPLED TO A PROCESSOR, AT LEAST ONE TEMPERATURE ACHIEVED WITHIN A PLURALITY OF TEMPERATURE REGIONS BASED ON A FREQUENCY SHIFT EXHIBITED BY A SUPERCONDUCTING RESONATOR COMPRISED WITHIN A QUANTUM COMPUTING DEVICE LAYOUT DUE TO A CHANGE IN KINETIC INDUCTANCE

1104 — GENERATING, BY THE SYSTEM, A MAP BASED ON THE AT LEAST ONE TEMPERATURE THAT CHARACTERIZES A TEMPERATURE DISTRIBUTION ACHIEVED DURING AN OPERATION OF THE QUANTUM COMPUTING DEVICE LAYOUT

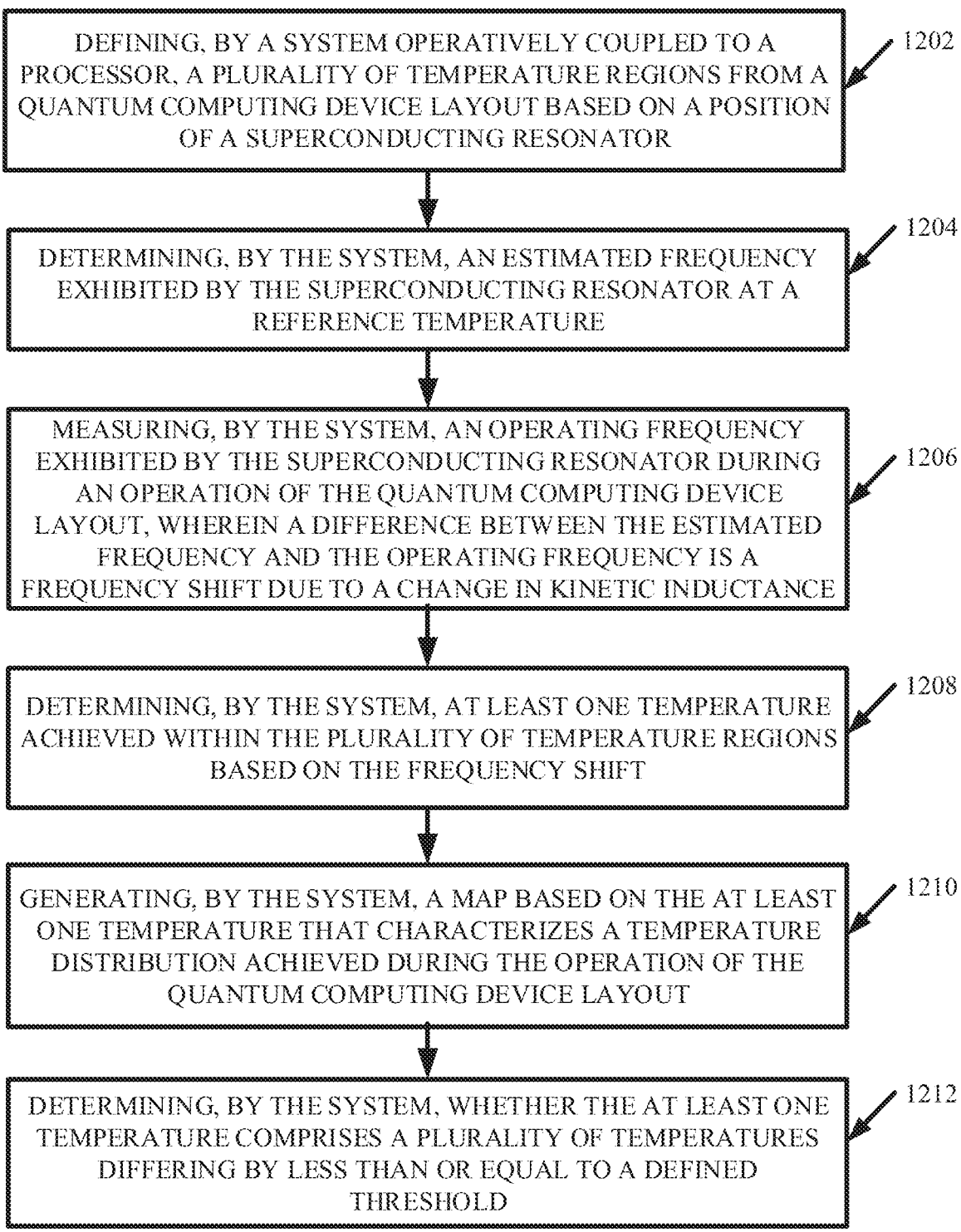

US 11,674,854 B2

MAPPING TEMPERATURE DISTRIBUTION IN SUPERCONDUCTING DEVICES

BACKGROUND

The subject disclosure relates to mapping temperature distribution in one or more superconducting devices, and more specifically, mapping the temperature distribution exhibited by a superconductive quantum processor in a planar and/or three-dimensional scale.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can facilitate mapping temperature distribution in one or more superconducting devices are described.

According to an embodiment, a system is provided. The system can comprise a memory that can store computer executable components. The system can also comprise a processor, operably coupled to the memory, and that can execute the computer executable components stored in the memory. The computer executable components can comprise a region component that can define a plurality of temperature regions from a quantum computing device layout. The computer executable component can also comprise a map component that can generate a map that characterizes a temperature distribution by determining at least one temperature achieved within the plurality of temperature regions during an operation of the quantum computing device layout.

According to an embodiment, a system is provided. The system can comprise a memory that can store computer executable components. The system can also comprise a processor, operably coupled to the memory, and that can execute the computer executable components stored in the memory. The computer executable components can comprise a temperature estimation component that can determine at least one temperature achieved within a plurality of temperature regions based on a frequency shift exhibited by a superconducting resonator comprised within a quantum computing device layout due to a change in kinetic inductance. The computer executable components can also comprise a map component that can generate a map based on the at least one temperature that characterizes a temperature distribution achieved during an operation of the quantum computing device layout.

According to an embodiment, a computer-implemented method is provided. The computer-implemented method can comprise defining, by a system operatively coupled to a processor, a plurality of temperature regions from a quantum computing device layout. The computer-implemented method can also comprise generating, by the system, a map that characterizes a temperature distribution by determining at least one temperature achieved within the plurality of temperature regions during an operation of the quantum computing device layout.

According to an embodiment, a computer-implemented method is provided. The computer-implemented method can comprise determining, by a system operatively coupled to a processor, at least one temperature achieved within a plurality of temperature regions based on a frequency shift exhibited by a superconducting resonator comprised within a quantum computing device layout due to a change in kinetic inductance. The computer-implemented method can also comprise generating, by the system, a map based on the at least one temperature that characterizes a temperature distribution achieved during an operation of the quantum computing device layout.

According to an embodiment, a computer program product for analyzing a temperature of a superconducting quantum processor is provided. The computer program product can comprise a computer readable storage medium having program instructions embodied therewith The program instructions can be executable by a processor to cause the processor to define, by a system operatively coupled to the processor, a plurality of temperature regions from a quantum computing device layout. The program instructions can further cause the processor to generate, by the system, a map that characterizes a temperature distribution by determining at least one temperature achieved within the plurality of temperature regions during an operation of the quantum computing device layout.

BRIEF DESCRIPTION OF THE DRAWINGS

FIG. 11 illustrates a flow diagram of an example, non-limiting method that can facilitate analyzing a temperature distribution exhibited by one or more quantum computing device layouts in accordance with one or more embodiments described herein.

FIG. 12 illustrates a flow diagram of an example, non-limiting method that can facilitate analyzing a temperature distribution exhibited by one or more quantum computing device layouts in accordance with one or more embodiments described herein.

DETAILED DESCRIPTION

Figure 1:
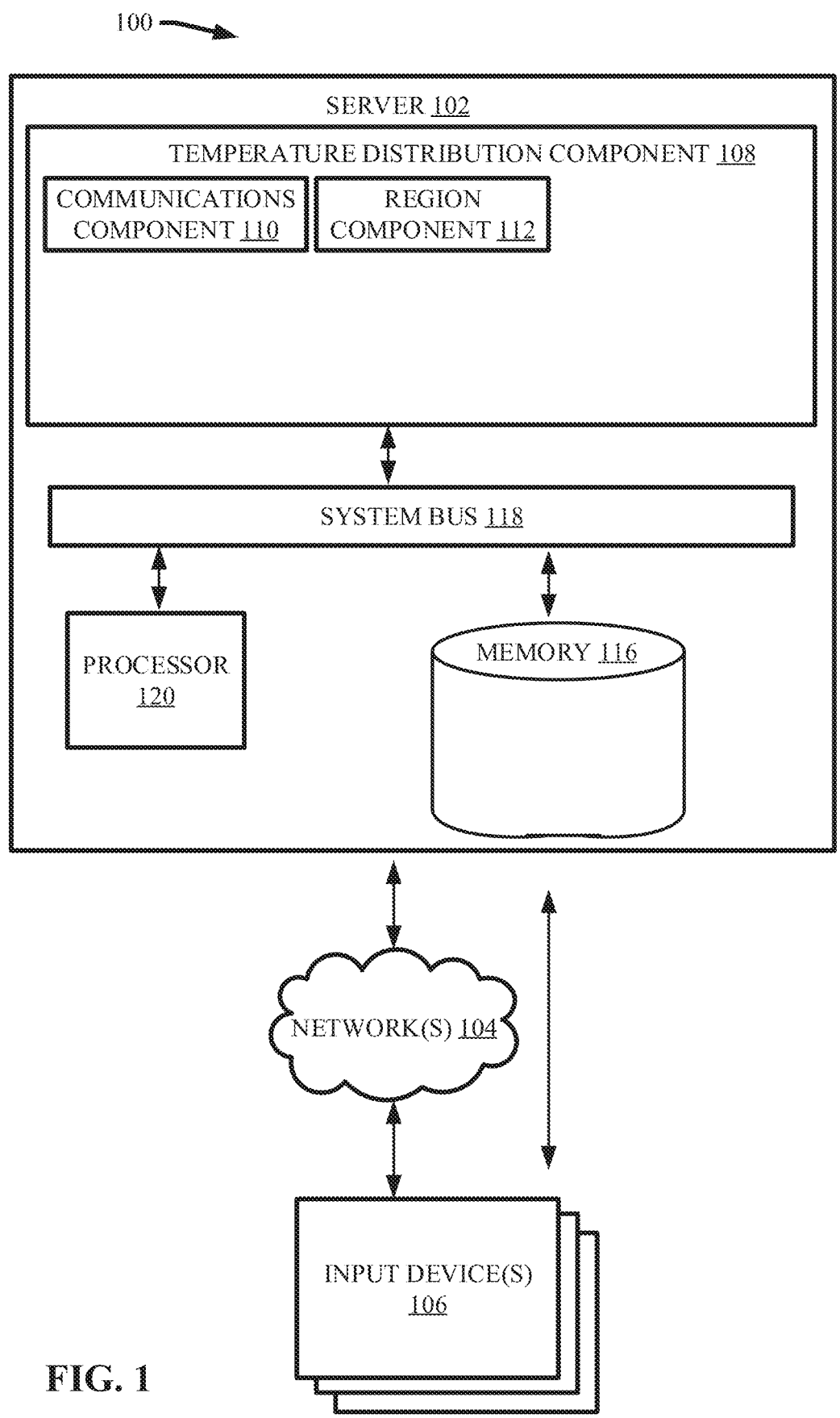
FIG. 1 illustrates a block diagram of an example, non-limiting system that can divide one or more quantum computing device layouts into a plurality of temperature regions in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

The longevity of quantum computing devices, such as superconductive qubits, can be maximized by maintaining a uniform temperature distribution below 100 milli-Kelvin (mK) during operation. Conventional techniques for determining the temperature of quantum computing devices include the use of temperature sensors positioned within, and/or adjacent to, one or more mixing chambers in a dilution refrigerator. However, while there can be a non-negligible distance between the dilution refrigerator and the quantum computing device. Further, various temperature differences can exist at different locations of the quantum computing devices. Thus, measuring the temperature at a mixing chamber can be ineffective in determining a temperature distribution through the one or more quantum computing devices.

Various embodiments of the present invention can be directed to computer processing systems, computer-implemented methods, apparatus and/or computer program products that facilitate the efficient, effective, and autonomous (e.g., without direct human guidance) determination of a temperature distribution exhibited by one or more quantum computing device layouts. One or more embodiments can comprise dividing one or more quantum computing device layouts into a plurality of temperature regions. Further, the temperature within the one or more temperatures regions can be determined. For example, the temperature within the one or more temperature regions can be determined based on a frequency shift exhibited by one or more superconducting resonators comprised within the one or more quantum computing device layouts due to a change in kinetic inductance. Additionally, one or more maps can be generated based on the determined temperatures of the temperature regions in order to characterize a temperature distribution exhibited by the one or more quantum computing device layouts during operation. Various embodiments can also include analyzing the one or more generated maps to determine whether any temperature differences between the temperature regions exceed a defined threshold. Moreover, one or more embodiments described herein can recommend a repositioning of the one or more superconducting resonators to alter the temperature distribution depicted by the one or more maps.

The computer processing systems, computer-implemented methods, apparatus and/or computer program products employ hardware and/or software to solve problems that are highly technical in nature (e.g., determining the temperature distribution of one or more quantum computing devices), that are not abstract and cannot be performed as a set of mental acts by a human. For example, an individual cannot readily simulate standard operating conditions of a quantum computing device, measure the operating frequency of superconducting resonators, and/or map temperature distributions as performed by various embodiments described herein.

FIG. 1 illustrates a block diagram of an example, non-limiting system 100 that can determine a temperature distribution exhibited by one or more quantum computing device layouts. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, and/or one or more input devices 106. The server 102 can comprise temperature distribution component 108. The temperature distribution component 108 can further comprise communications component 110 and/or region component 112. Also, the server 102 can comprise or otherwise be associated with at least one memory 116. The server 102 can further comprise a system bus 118 that can couple to various components such as, but not limited to, the temperature distribution component 108 and associated components, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the temperature distribution component 108 can be provided on the one or more servers 102, it should be appreciated that the architecture of system 100 is not so limited. For example, the temperature distribution component 108, or one or more components of temperature distribution component 108, can be located at another computer device, such as another server device, a client device, etc.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. A user of the system 100 can utilize the one or more input devices 106 to input data into the system 100, thereby sharing (e.g., via a direct connection and/or via the one or more networks 104) said data with the server 102. For example, the one or more input devices 106 can send data to the communications component 110 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

A user of the system 100 can utilize the one or more input devices 106 and/or the one or more networks 104 to input one or more quantum computing device layouts into the system 100. For example, one or more quantum computing device layouts can regard the position, connectivity, and/or characteristics of one or more features of a subject quantum computing device. Example quantum computing device features that can be comprised within the one or more quantum computing device layouts can include, but are not limited to: qubits, transmission lines, substrates, a combination thereof, and/or the like. For instance, the one or more quantum computing device layouts can depict the position and/or connectivity of one or more qubits and/or transmission lines on a dielectric substrate. In a further example, characteristics delineated by the one or more quantum computing device layouts can include, but are not limited to: materials comprised within one or more features (e.g., the material composition of one or more qubits and/or transmission lines), physical properties of one or more features, structure of one or more features, a combination thereof, and/or the like.

For example, the one or more quantum computing device layouts can characterize one or more superconducting quantum processors. The one or more quantum computing device layouts can delineate the position, connectivity, and/or characteristics of one or more features comprised within the one or more superconducting quantum processors. For instance, one or more quantum computing device layouts can delineate that one or more transmission lines comprised within the one or more superconducting quantum processors can be superconducting microwave resonators operating in a frequency range greater than or equal to 1 gigahertz (GHz) and less than or equal to 10 GHz. Further, the superconducting resonators of the one or more superconducting quantum processors can be, as described by the one or more quantum computer device layouts, microstrip transmission lines and/or coplanar waveguide transmission lines. Moreover, the one or more quantum computer device layouts can delineate a material composition of the one or more superconducting resonators. Example materials that can be comprised within the one or more superconducting resonators can include, but are not limited to: pure type I metals (e.g., obeying the Bardeen-Cooper-Schrieffer ("BCS") theory), such as aluminum; pure type II metals (e.g., BCS theory), such as niobium; high thermal conductivity dielectrics, such as silicon; a combination thereof, and/or the like. In various embodiments, the one or more superconducting quantum processors can comprise multiple device layers, wherein the one or more quantum computing device layouts can delineate the position, connectivity, and/or characteristics of the one or more features comprised on each device layer.

The communications component 110 can receive the one or more quantum computing device layouts inputted via the one or more input devices 106 and share the one or more quantum computing device layouts with one or more components of the system 100. For example, the communications component 110 can share the one or more quantum computing device layouts with the region component 112.

The region component 112 can divide the one or more quantum computing device layouts into a plurality of temperature regions. The temperature regions can be defined by one or more polygonal or non-polygonal shapes (e.g., rectangles, squares, circles, triangles, and/or the like). Further, the region component 112 can assign one or more reference titles to the plurality of temperature regions. In one or more embodiments, the temperature regions can be positioned adjacent to each other on the one or more quantum computing device layouts. In one or more embodiments, one or more of the temperature regions can overlap with each other on the one or more quantum computing device layouts. Additionally, the total area of the one or more quantum computing device layouts comprised within the respective temperature regions can be uniform or non-uniform amongst the plurality of temperature regions.

In various embodiments, the region component 112 can generate the temperature regions and/or determine the position of the temperature regions with regards to the one or more quantum computing device layouts based on the location of one or more heat generating elements in the one or more quantum computing device layouts. For example, the region component 112 can divide the one or more quantum computing device layouts into temperature regions based on the location of one or more transmission lines comprised within the one or more quantum computing device layouts. Additionally, the region component 112 can generate the temperature regions and/or determine the position of the temperature regions within the one or more quantum computing device layouts based on the number of heat generating elements in the one or more quantum computing device layouts. For example, the region component 112 can divide the one or more quantum computing device layouts into temperature regions such that each temperature region comprises a defined number of heat generating elements. For instance, the region component 112 can divide the one or more quantum computing device layouts into temperature regions such that each temperature region comprises a transmission line comprised within the one or more quantum computing device layouts. In another instance, the region component 112 can divide the one or more quantum computing device layouts into temperature regions such that each temperature region comprises a plurality of transmission lines comprised within the one or more quantum computing device layouts.

Figure 2:
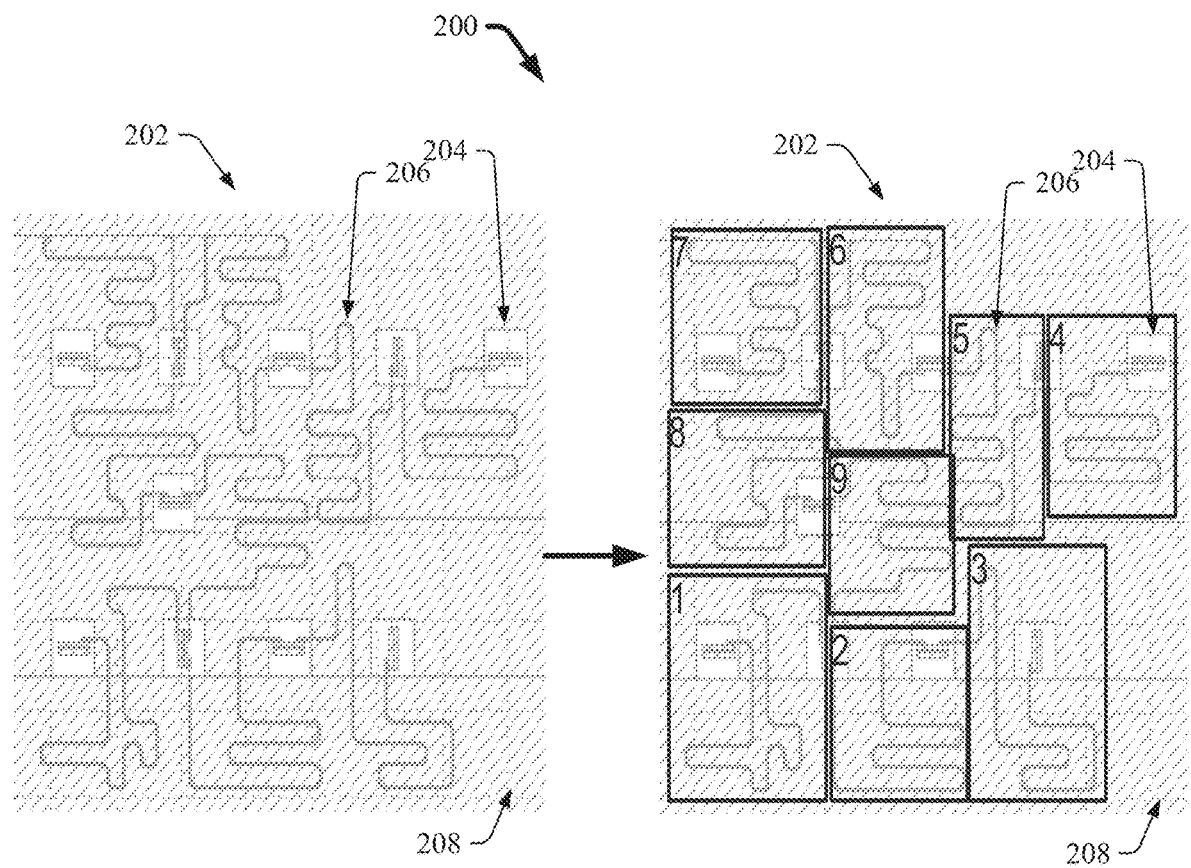
FIG. 2 illustrates a diagram of an example, non-limiting region generation processes that can comprise dividing one or more quantum computing device layouts into a plurality of temperature regions in accordance with one or more embodiments described herein.

FIG. 2 illustrates a diagram of an example, non-limiting region generation process 200 that can be implemented by the region component 112 in accordance with one or more embodiments described herein. Repetitive description of like elements employed in other embodiments described herein is omitted for sake of brevity. As shown in FIG. 2, an exemplary quantum computing device layout 202 can comprise one or more qubits 204 and/or transmission lines 206 (e.g., superconducting resonators) positioned on a dielectric substrate 208.

For example, the region component 112 can implement the exemplary region generation process 20 depicted in FIG. 2 by dividing the exemplary quantum computing device layout 202 into nine temperature regions. As shown in FIG. 2, the nine temperature regions can be depicted by bold lines and/or can define various sections of the exemplary quantum computing device layout 202. Further, the region component 112 can generate reference titles (e.g., reference numerals 1 through 9) for the respective temperature regions (e.g., as shown in FIG. 2). Additionally, the region component 112 can perform the exemplary region generation process 200 of FIG. 2 by dividing the exemplary quantum computing device layout 202 into temperature regions such that each temperature region comprises a transmission line 206 (e.g., a heat generating element). FIG. 2 also exemplifies that the amount of area of the exemplary quantum computing device layout 202 encompassed by the temperature regions can vary. While FIG. 2 depicts temperature regions sharing a rectangular shape, one of ordinary skill in the art will recognize that the architecture of the temperature regions is not so limited. For example, in various embodiments, one or more of the temperature regions can be characterized by a first shape while one or more other temperature regions can be characterized by a second shape.

Figure 3:
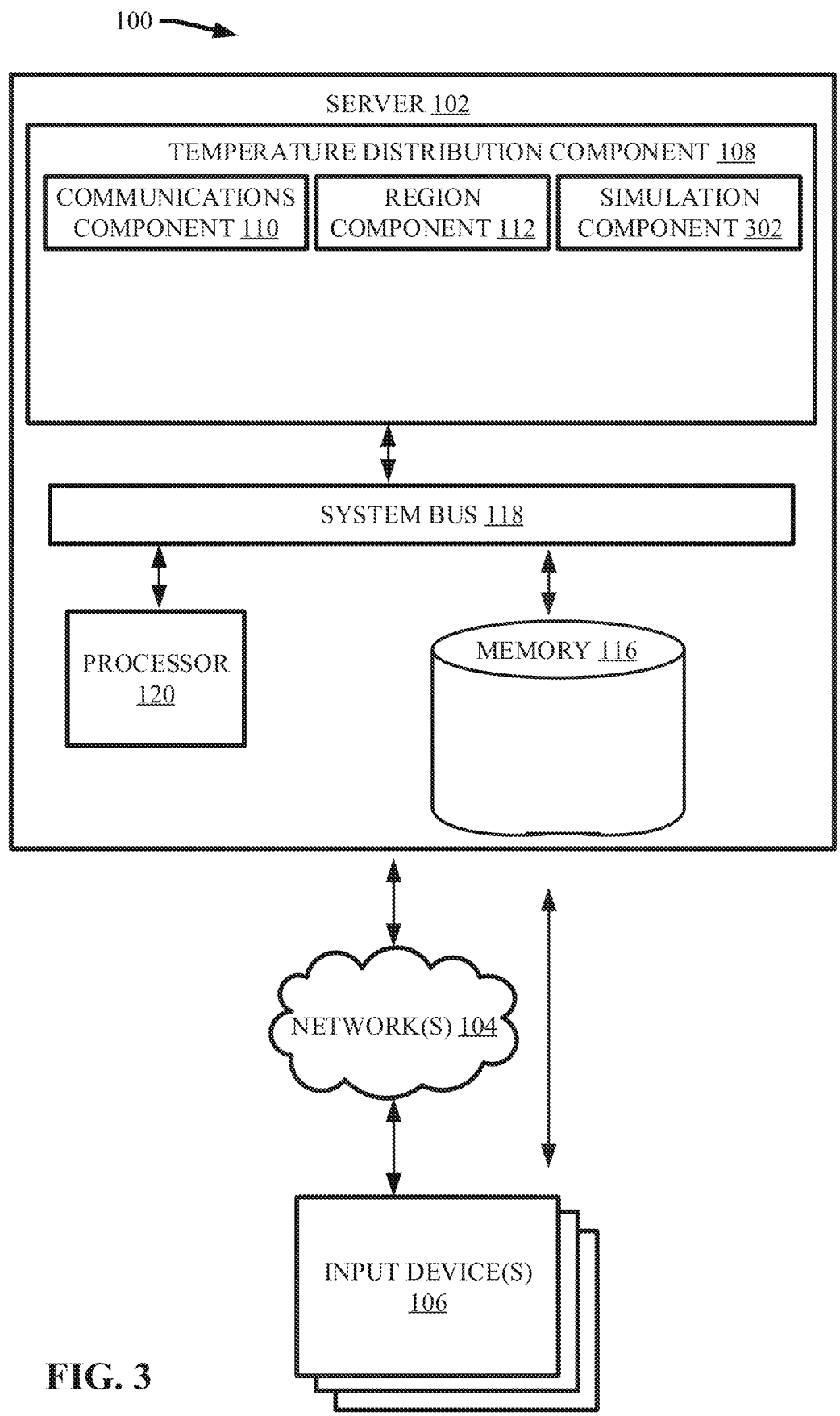
FIG. 3 illustrates a block diagram of an example, non-limiting system that can simulate operation of the one or more quantum device layouts to determine an estimated frequency exhibited by one or more superconducting resonators at a reference temperature in accordance with one or more embodiments described herein.

FIG. 3 illustrates a diagram of the example, non-limiting system 100 further comprising simulation component 302 in accordance with one or more embodiments described herein. Repetitive description of like elements employed in other embodiments described herein is omitted for sake of brevity. In various embodiments, the simulation component 302 can facilitate one or more determinations of the operating temperature within the temperature regions defined by the region component 112.

In one or more embodiments, the simulation component 302 can simulate operation of the one or more quantum computing device layouts to determine an estimated frequency exhibited by one or more transmission lines of the one or more quantum computing device layouts at a reference temperature. The simulation component 302 can assume standard operating conditions for the quantum device characterized by the one or more quantum computing device layouts. For example, the thermal energy can be lower than quantum energy levels spacing to prevent thermal noise, and/or the quantum energy levels spacing can be lower than a superconducting energy gap to prevent the creation of quasiparticles. Additionally, in one or more embodiments the simulation component 302 can assume that the one or more subject transmission lines can be superconducting resonators with an operating frequency greater than or equal to 1 GHz and less than or equal to 10 GHz.

In various embodiments, the simulation component 302 can use a perfect electric conductor ("PEC") model to determine an estimated frequency of the subject superconducting resonator at a reference temperature. The reference temperature can be a temperature at which a kinetic inductance value for the superconducting resonator is known. For example, the reference temperature can be zero Kelvin (K). For instance, the simulation component 302 can determine a simulation frequency (e.g., represented by "$f_1$") of the superconducting resonator in accordance with Equation 1, presented below.

$$f_1 = \frac{1}{2\pi\sqrt{LC}} \quad (1)$$

Wherein "L" can represent the inductance of the superconducting resonator, and/or "C" can represent the capacitance of the superconducting resonator.

However, the simulated operation can lack accountability for the kinetic inductance (e.g., a superconducting quantum effect) experienced by the superconducting resonator. In one or more embodiments, the simulation component 302 can further adjust the simulation frequency (e.g., represented by "$f_1$") to determine the estimated frequency (e.g., represented by "$f_0$") of the superconducting resonator. For instance, the simulation component 302 can determine the estimated frequency (e.g., represented by "$f_0$") in accordance with Equations 2 and/or 3, presented below.

$$f_0 = \frac{1}{2\pi\sqrt{L_{T0}C}} \quad (2)$$

$$L_{T0} = L + L_k(0) \quad (3)$$

Wherein "$L_k(0)$" can represent the kinetic inductance of the superconducting resonator at a reference temperature of 0 K.

Figure 4:
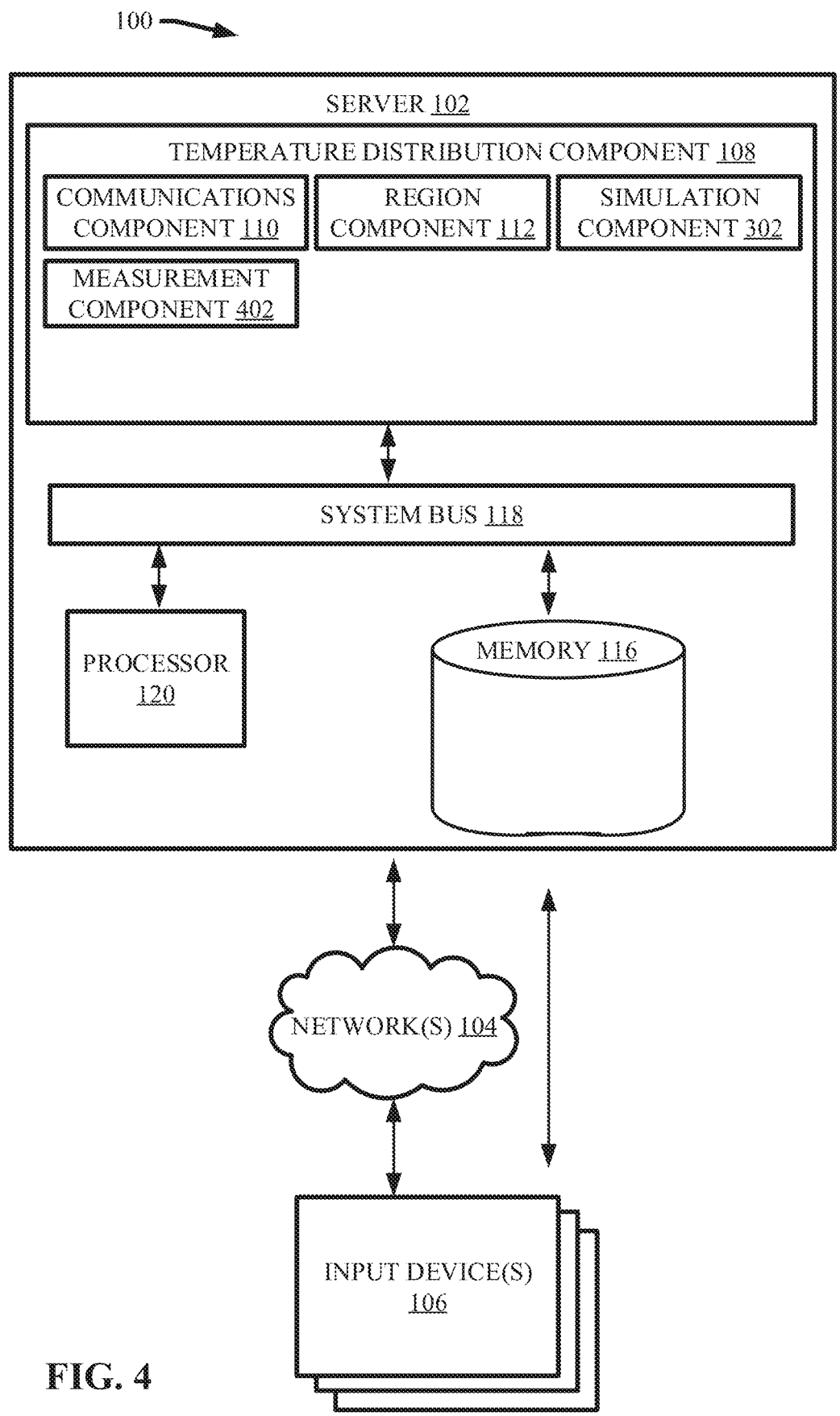
FIG. 4 illustrates a block diagram of an example, non-limiting system that can measure an operating frequency of one or more superconducting resonators in accordance with one or more embodiments described herein.

FIG. 4 illustrates a diagram the example, non-limiting system 100 further comprising measurement component 402 in accordance with one or more embodiments described herein. Repetitive description of like elements employed in other embodiments described herein is omitted for sake of brevity. In various embodiments, the measurement component 402 can further facilitate one or more determinations of the operating temperature within the temperature regions defined by the region component 112.

In one or more embodiments, the measurement component 402 can measure the actual operating frequency (e.g., represented by "f") of the one or more subject superconducting resonators comprised within the one or more quantum computing device layouts. For instance, the measurement component 402 can apply one or more microwave signals to the one or more superconducting resonators to facilitate measurement of the operating frequency (e.g., represented by "f"). Example sensors and/or measurement technologies that can be comprised within the measurement component 402, and/or communicate with the measurement component 402, can include, but are not limited to: network and/or vector analyzers ("VNA"), oscilloscopes, Raby interferometry, Ramsey interferometry, a combination thereof, and/or the like. Further, the measured operating frequency (e.g., represented by "f") can be characterized by Equation 4 and/or 5, presented below.

$$f = \frac{1}{2\pi\sqrt{L_T C}} \quad (4)$$

$$L_T = L + L_k(T) \quad (5)$$

Wherein "T" can represent an operating temperature of the superconducting resonator (e.g., a temperature achieved by the superconducting resonator during operation of the one or more quantum computing device layouts), and/or "$L_k(T)$" can represent the kinetic inductance experienced by the superconducting resonator at the operating temperature.

At least because kinetic inductance increases with temperature, the measured operating frequency (e.g., measured by the measurement component 402) can be smaller than the estimated frequency (e.g., determined by the simulation component 302). For example, the temperature at which the one or more subject superconducting resonators operate can be greater than the reference temperature utilized to determine the estimated frequency. An instance wherein the measured operating frequency is larger than the estimated frequency can be indicative of an error in the simulation performed by the simulation component 302 and/or a need to utilize a lower reference temperature. In one or more embodiments, the simulation and/or determinations performed by the simulation component 302 can be repeated and/or altered in response to the measured operating frequency being larger that the estimated frequency.

Figure 5:
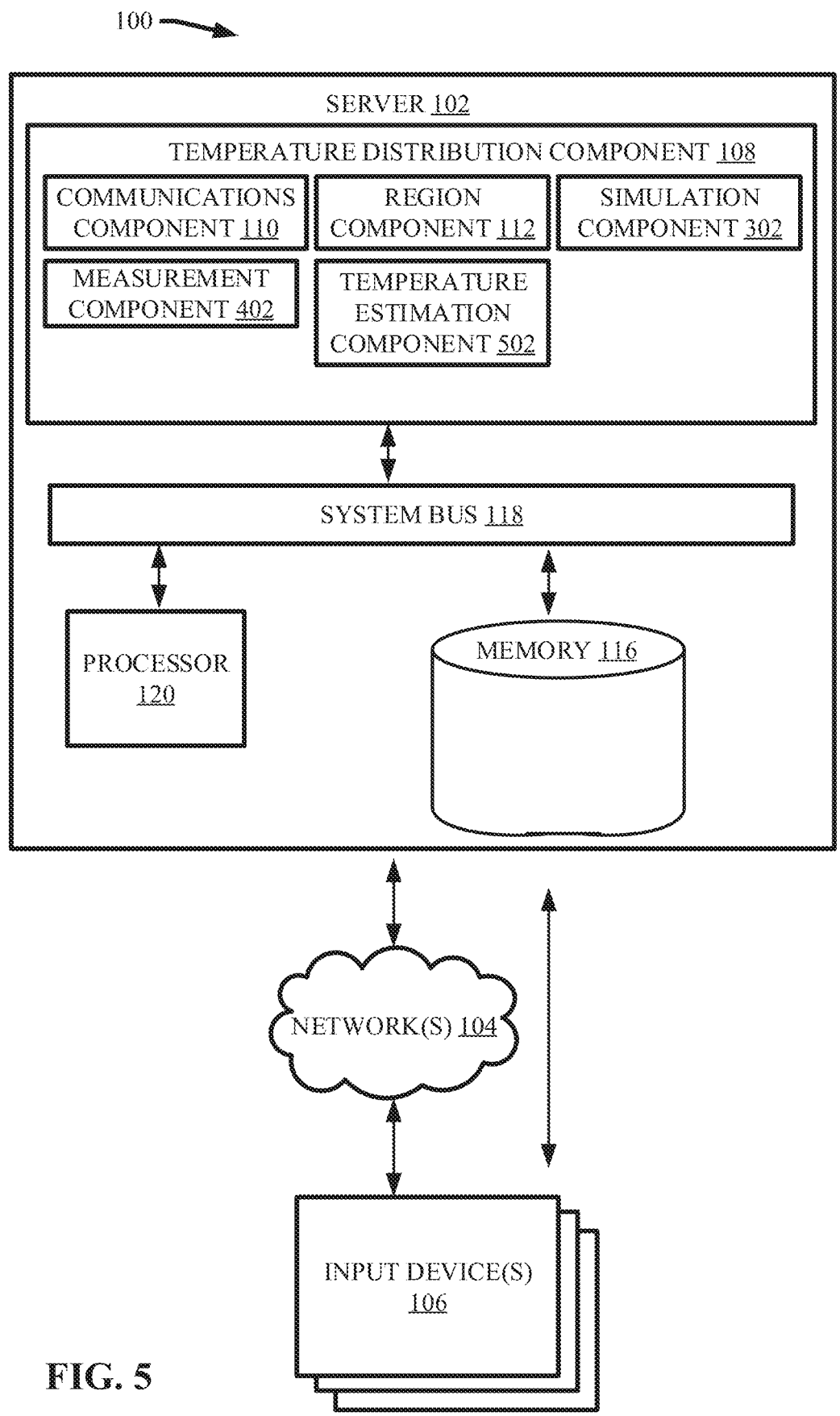
FIG. 5 illustrates a block diagram of an example, non-limiting system that can determine at least one temperature achieved with a plurality of temperature regions of one or more quantum computing device layouts during operation in accordance with one or more embodiments described herein.

FIG. 5 illustrates a diagram of the example, non-limiting system 100 further comprising temperature estimation component 502 in accordance with one or more embodiments described herein. Repetitive description of like elements employed in other embodiments described herein is omitted for sake of brevity. In various embodiments, the temperature estimation component 502 can determine the operating temperature achieved within the one or more temperature regions by the one or more quantum computing device layouts during operation.

For example, the temperature estimation component 502 can determine the operating temperature (e.g., represented by "T") achieved by the one or more subject superconducting resonators during operation of the one or more quantum computing device layouts. The temperature estimation component 502 can determine the operating temperature (e.g., represented by "T") of the superconducting resonators based on the measured operating frequency (e.g., represented by "f") and/or estimated frequency (e.g., represented by "$f_0$") of the one or more superconducting resonators. For example, the temperature estimation component 502 can determine the operating temperature (e.g., represented by "T") of the superconducting resonators in accordance with Equations 6 and/or 7, presented below.

$$T = \frac{1}{T_C} \sqrt[4]{1 - \left(\frac{f}{f_0}\right)^2} \pm T_{err} \quad (6)$$

$$T_{err} \cong 2\pi\hbar(f_0 - f)/k_b \quad (7)$$

Wherein "$k_b$" can represent Boltzmann constant, "h" can represent Planck constant, "$T_{err}$" can represent an upper bound for temperature measurement error based on quantum energy variation due to a microwave signal being applied to the one or more superconducting resonators (e.g., to facilitate measuring the operating frequency), and/or "$T_c$" can represent the superconducting material's critical temperature (e.g., a temperature below which the material becomes a superconductor). Also, the temperatures can be represented in units of Kelvin.

In one or more embodiments, the temperature estimation component 502 can further determine the operating temperature achieved within the one or more temperature regions based on the determined operating temperature of the one or more superconducting resonators (e.g., represented by "T"). For example, wherein a first temperature region comprises a single first transmission line (e.g., a superconducting resonator), the temperature estimation component 502 can determine that the operating temperature achieved within the first temperature region during operation of the one or more quantum computing device layouts can be equal to or great than the operating temperature of the first transmission line (e.g., as determined in accordance with Equation 6 and/or 7).

In another example, wherein a second temperature region comprises a second transmission line (e.g., a superconducting resonator) and third transmission line (e.g., a superconducting resonator), the temperature estimation component 502 can determine that the operating temperature achieved within the second temperature region during operation of the one or more quantum computing device layouts can be a function of the operating temperatures of both the second and third transmission lines.

Figure 6:
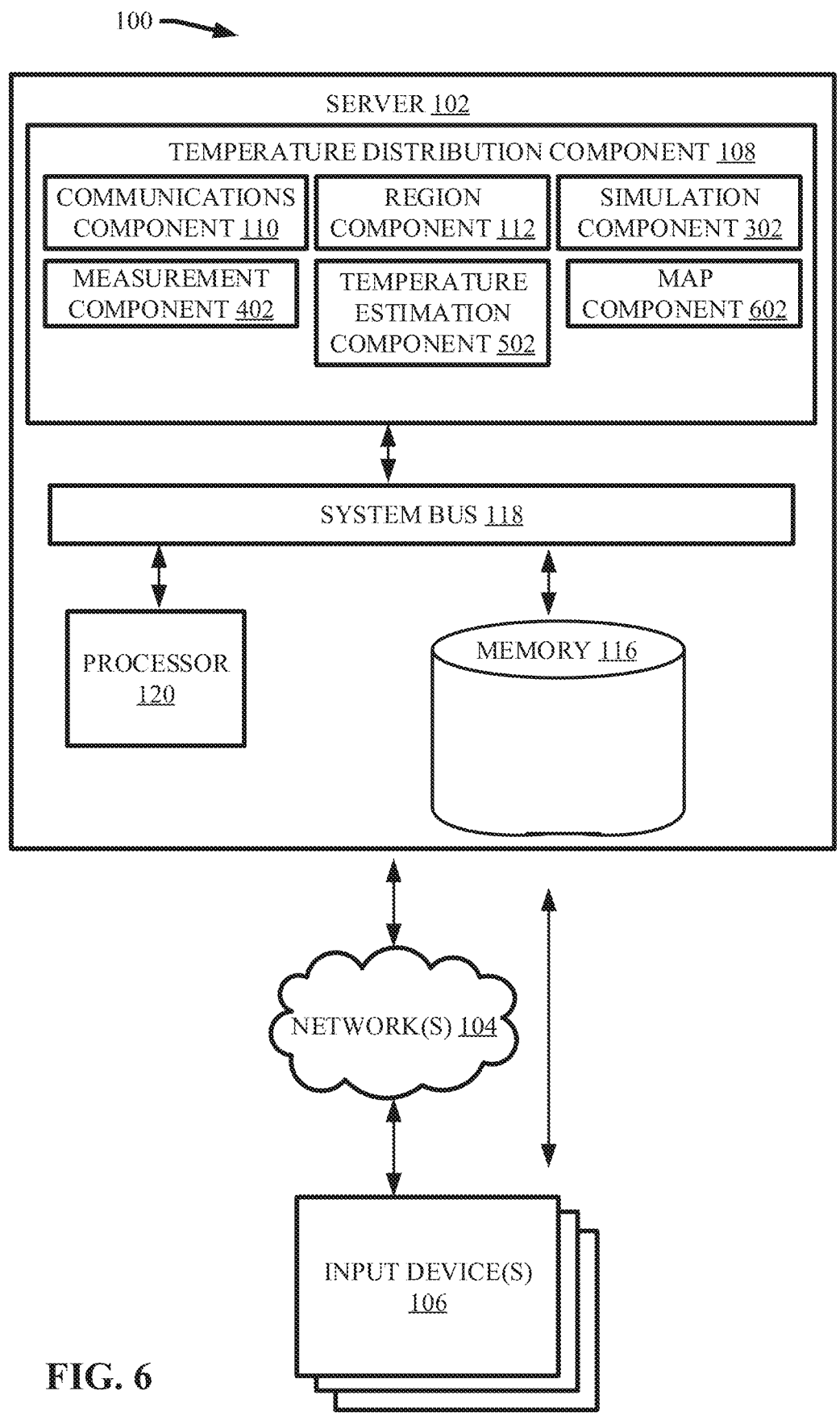
FIG. 6 illustrates a block diagram of an example, non-limiting system that can generate one or more maps, which can characterize a temperature distribution exhibited by one or more quantum computing device layouts in accordance with one or more embodiments described herein.

FIG. 6 illustrates a diagram of the example, non-limiting system 100 further comprising map component 602 in accordance with one or more embodiments described herein. Repetitive description of like elements employed in other embodiments described herein is omitted for sake of brevity. In various embodiments, the map component 602 can generate one or more maps that can characterize a temperature distribution achieved during an operation of the quantum computing device layout.

The map component 602 can generate the one or more maps based on: the one or more quantum computing device layouts (e.g., received by the communications component 110), the one or more temperature regions (e.g., defined by the region component 112), and/or the one or more operating temperatures achieved within each temperature region (e.g., as determined by the temperature estimation component 502). For example, the one or more maps generated by the map component 602 can depict the temperature distribution within each temperature region (e.g., thereby depicting the temperature distribution throughout the one or more quantum computing device layouts), wherein operating temperatures within the temperature regions can dissipate from heat generating features. For instance, the temperature regions can comprise varying temperatures throughout various portions of the temperature regions as heat generated by one or more superconducting resonators within the temperature regions dissipates into the surrounding environment and/or features. In one or more embodiments, the map component 602 can account for heat dissipation based on one or more characteristics included in the one or more quantum computing device layouts (e.g., material compositions of features surrounding one or more heat generating features). Further, the map component 602 can correlate the heat dissipation into one or more temperature distributions based further one the one or more operating temperatures of one or more features (e.g., superconducting resonators) of the one or more quantum computing device layouts.

In one or more embodiments, the one or more maps can comprise operating temperatures and/or operating temperature distributions superimposed onto the one or more quantum computing device layouts and/or temperature regions. Additionally, the one or more maps can delineate the highest temperature achieved within each temperature region (e.g., the highest operating temperature of one or more superconducting resonators with the temperature regions) and/or the average temperature achieved within temperature region. In various embodiments, the one or more quantum computing device layouts can regard a plurality of device layers and/or the map component 602 can generate a map with regards to one or more of the device layers.

Figure 7:
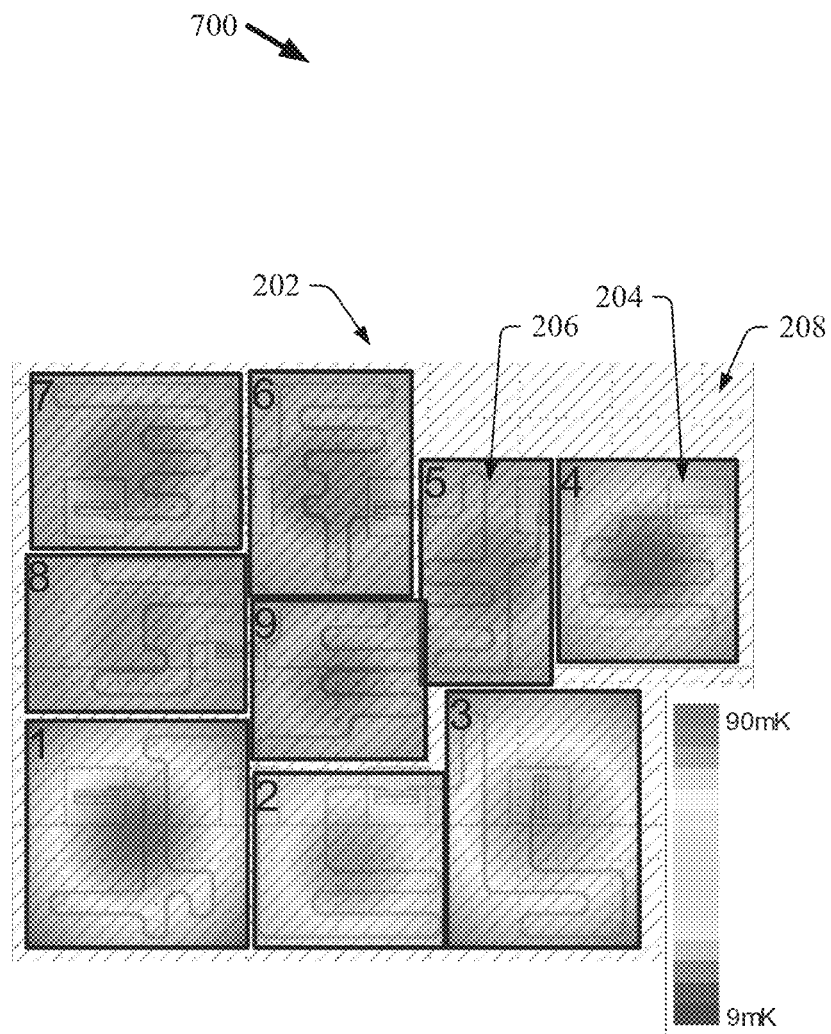
FIG. 7 illustrates a diagram of an example, non-limiting map that can characterize a temperature distribution exhibited by one or more quantum computing device layouts in accordance with one or more embodiments described herein.

FIG. 7 illustrates a diagram of an example, non-limiting map 700 that can be generated by the map component 602 in accordance with one or more embodiments described herein. Repetitive description of like elements employed in other embodiments described herein is omitted for sake of brevity. As shown in FIG. 7 the exemplary map 700 can be generated based on the exemplary quantum computing device layout 202 and/or temperature regions shown in FIG. 2.

FIG. 7 depicts an exemplary manner in which the one or more maps generated by the map component 602 can depict one or more operating temperature distributions (e.g., temperature distributions experienced during operation of the one or more quantum computing device layouts) within the one or more temperature regions. For example, the one or more operating temperature distributions can be depicted via a gradient scheme representing a temperature scale.

Figure 8:
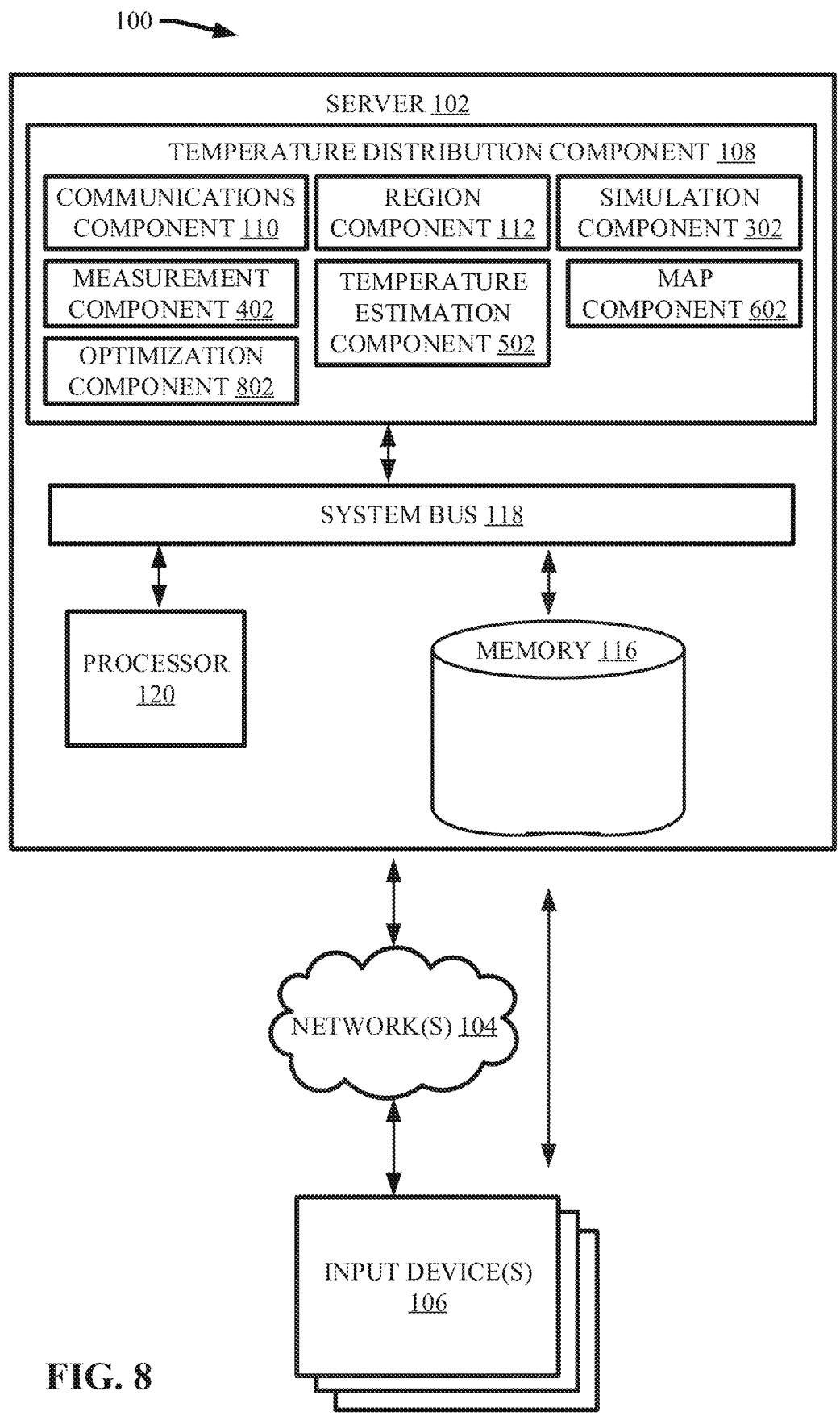
FIG. 8 illustrates a block diagram of an example, non-limiting system that can determine whether a temperature distribution exhibited by one or more quantum computing device layouts is uniform in accordance with one or more embodiments described herein.

FIG. 8 illustrates a diagram of the example, non-limiting system 100 further comprising optimization component 802 in accordance with one or more embodiments described herein. Repetitive description of like elements employed in other embodiments described herein is omitted for sake of brevity. In various embodiments, the optimization component 802 can determine whether the one or more quantum computing device layouts can achieve a uniform temperature distribution based on the one or more maps generated by the map component 602.

In one or more embodiments, the optimization component 802 can compare the operating temperatures achieved in the various temperature regions to determine whether the temperature distribution of the one or more quantum computing device layouts is uniform or non-uniform. For example, the optimization component 802 can determine that the temperature distribution of the one or more quantum computing device layouts is uniform based on a temperature difference between the operating temperatures within respective temperature regions being less than or equal to a defined threshold. In another example, the optimization component 802 can determine that the temperature distribution of the one or more quantum computing device layouts is non-uniform based on a temperature difference between the operating temperatures within respective temperature regions being greater than the defined threshold. The threshold can be defined by one or more users of the system 100 via the one or more input devices 106. For instance, the threshold can have an exemplary value of 10 mK.

In various embodiments, the optimization component 802 can further generate one or more recommendations in response to determining that the one or more quantum computing devices can achieve a non-uniform temperature distribution. The one or more recommendations can regard the repositioning of one or more features comprised within the one or more quantum computing device layouts. For example, the recommended repositioning can alter the temperature distribution of the one or more quantum computing device layouts to facilitate a more uniform temperature distribution. For instance, the recommendations can regard moving one or more features of the subject quantum computing layout from a first temperature region to one or more other temperature regions.

Figure 9:
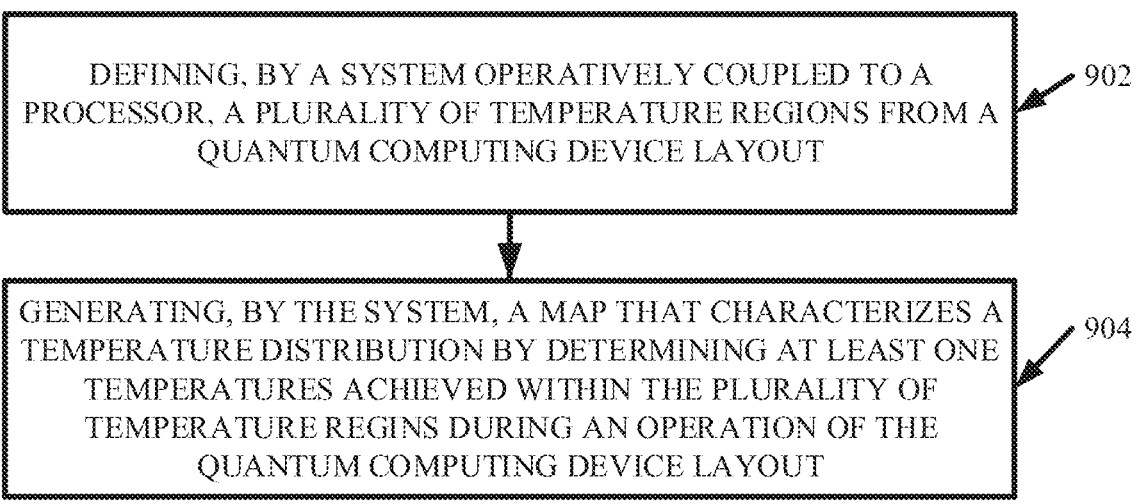
FIG. 9 illustrates a flow diagram of an example, non-limiting method that can facilitate analyzing a temperature distribution exhibited by one or more quantum computing device layouts in accordance with one or more embodiments described herein.

FIG. 9 illustrates flow diagram of an example, non-limiting method 900 that can facilitate determining a temperature distribution of one or more quantum computing device layouts in accordance with one or more embodiments described herein. Repetitive description of like elements employed in other embodiments described herein is omitted for sake of brevity.

At 902, the method 900 can comprise defining (e.g., via the region component 112), by a system 100 operatively coupled to one or more processors 120, a plurality of temperature regions from one or more quantum computing device layouts. As described herein, the one or more quantum computing device layouts can delineate the positioning, connectivity, and/or characteristics of one or more features of a quantum computing device (e.g., a superconducting quantum processor). Further, the defining at 902 can be based on the positioning of one or more features from the one or more quantum computing device layouts, as described herein. For instance, the one or more temperature regions can be defined based on the position and/or connectivity of one or more transmission lines of the one or more quantum computing device layouts (e.g., wherein the one or more transmission lines can be superconducting resonators). As described herein, the one or more temperature regions can be characterized by various sizes and/or shapes. For example, the defining at 902 can be performed in accordance with the various features described herein with regard to the exemplary region generation process 200.

At 904, the method 900 can comprise generating (e.g., via the map component 602), by the system 100, one or more maps that can characterize one or more temperature distributions by determining at least one temperature achieved within the plurality of temperature regions during an operation of the one or more quantum computing device layouts. For example, the at least one temperature can comprise operating temperatures that can be achieved within the one or more temperature regions. In various embodiments, the operating temperatures of the temperature regions can be determined based on the operating temperatures of one or more heat generating elements within the temperature regions, such as the operating temperatures of one or more transmission lines within the temperature regions.

By determining the temperatures achieved within the plurality of temperature regions, the method 900 can generate one or more maps depicting temperature distribution experienced by the one or more quantum computing device layouts during operation. Further, the one or more maps can facilitate one or more attempts to prolong the longevity of the one or more quantum computing devices by altering the one or more one or more quantum computing device layouts to achieve a desired uniformity in the temperature distribution.

Figure 10:
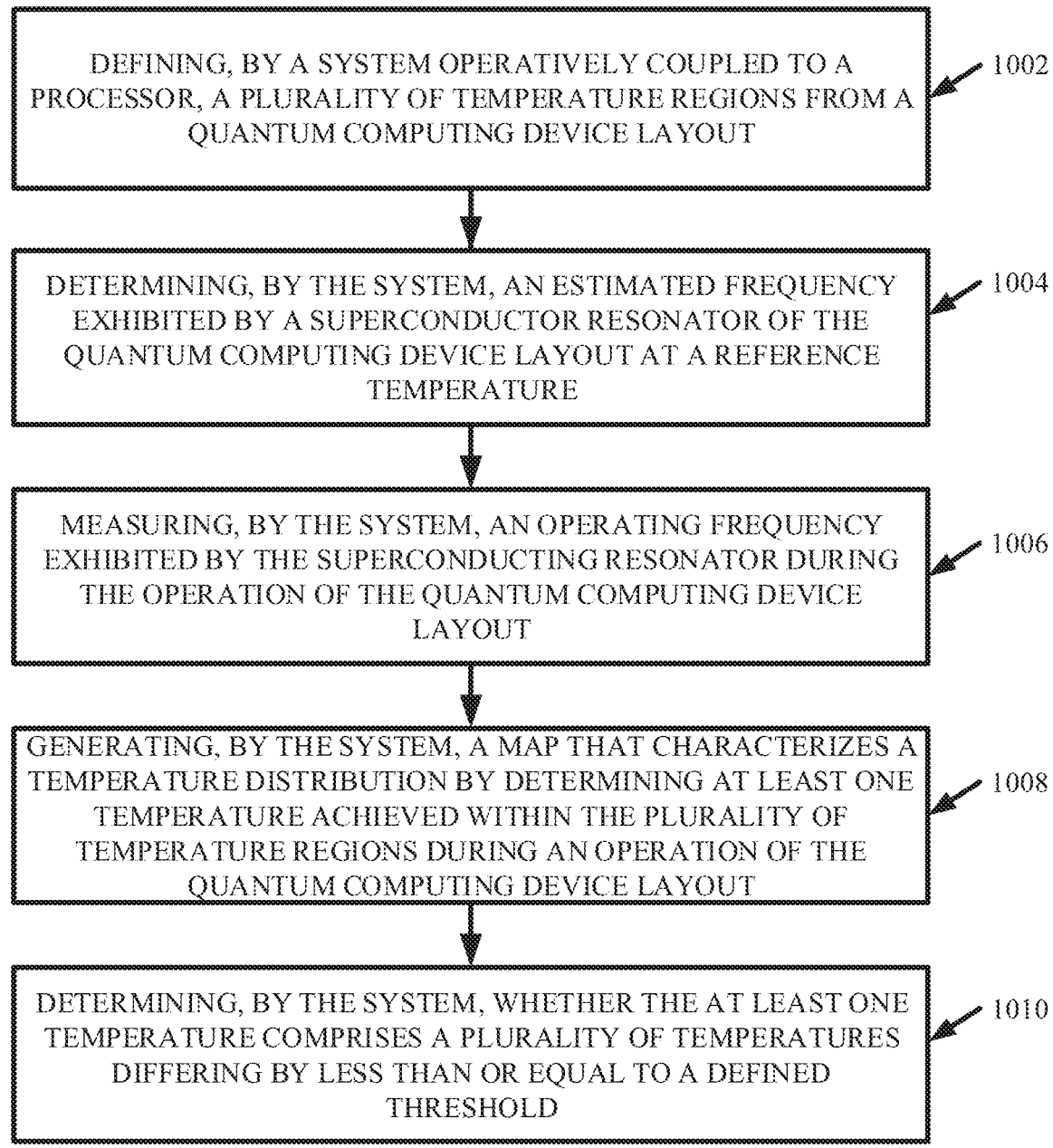
FIG. 10 illustrates a flow diagram of an example, non-limiting method that can facilitate analyzing a temperature distribution exhibited by one or more quantum computing device layouts in accordance with one or more embodiments described herein.

FIG. 10 illustrates flow diagram of an example, non-limiting method 1000 that can facilitate determining a temperature distribution of one or more quantum computing device layouts in accordance with one or more embodiments described herein. Repetitive description of like elements employed in other embodiments described herein is omitted for sake of brevity.

At 1002, the method 1000 can comprise defining (e.g., via the region component 112), by a system 100 operatively coupled to one or more processors 120, a plurality of temperature regions from one or more quantum computing device layouts. As described herein, the one or more quantum computing device layouts can delineate the positioning, connectivity, and/or characteristics of one or more features of a quantum computing device (e.g., a superconducting quantum processor). Further, the defining at 1002 can be based on the positioning of one or more features from the one or more quantum computing device layouts, as described herein. For instance, the one or more temperature regions can be defined based on the position and/or connectivity of one or more transmission lines of the one or more quantum computing device layouts (e.g., wherein the one or more transmission lines can be superconducting resonators). As described herein, the one or more temperature regions can be characterized by various sizes and/or shapes. For example, the defining at 1002 can be performed in accordance with the various features described herein with regard to the exemplary region generation process 200.

At 1004, the method 1000 can comprise determining (e.g., via simulation component 302), by the system 100, an estimated frequency (e.g., represented herein by "$f_0$") that can be exhibited by one or more superconducting resonators of the one or more quantum computing device layouts at a reference temperature. For example, the one or more superconducting resonators can be transmission lines, and/or the determining at 1004 can be performed in accordance with Equations 1-3. In various embodiments, the determining at 1004 can comprise simulating operation of the one or more superconducting resonators using one or more PEC models. Additionally, the reference temperature can be a temperature associated with a known kinetic inductance of the one or more superconducting resonators (e.g., a reference temperature of 0 K).

At 1006, the method 1000 can comprise measuring (e.g., via measurement component 402), by the system 100, an operating frequency (e.g. represented herein by "f") exhibited by the one or more superconducting resonators during the operation of the quantum computing device layout. For example, the operating frequency (e.g. represented herein by "f") can be characterized by Equation 4 and/or 5. One or more sensors and/or measurement technologies that can facilitate the measuring at 1006 can include, but are not limited to: network and/or vector analyzers ("VNA"), oscilloscopes, Raby interferometry, Ramsey interferometry, a combination thereof, and/or the like.

At 1008, the method 1000 can comprise generating (e.g., via map component 602), by the system 100, one or more maps that can characterize one or more temperature distributions by determining (e.g., via temperature estimation component 502) at least one temperature achieved within the plurality of temperature regions during an operation of the one or more quantum computing device layouts. For example, the at least one temperature can comprise operating temperatures that can be achieved within the one or more temperature regions. In one or more embodiments, the one or more quantum computing device layouts can comprise a plurality of device layers, wherein the generating at 1008 can comprise generating one or more maps for each device layer.

In various embodiments, the operating temperatures of the temperature regions can be determined based on the operating temperatures of one or more heat generating elements within the temperature regions, such as the operating temperatures of one or more transmission lines within the temperature regions. Further, operating temperature of the one or more transmission lines (e.g., the one or more superconducting resonators) can be determined based on the estimated frequency (e.g., represented herein by "$f_0$") determined at 1004 and/or the operating frequency (e.g. represented herein by "f") measured at 1006. For instance, the operating temperature of the one or more transmission lines (e.g., superconducting resonators) can be determined in accordance with Equation 6 and/or 7; thereby the operating temperatures within the temperature regions can be determined at 1008.

At 1010, the method 1000 can comprise determining (e.g., via optimization component 802), by the system 100, whether the at least one temperature comprises a plurality of temperatures differing by less than or equal to a defined threshold. For example, the temperature distribution can be characterized as uniform wherein the operating temperatures of the temperature regions differ by less than or equal to a defined threshold. In another example, the temperature distribution can be characterized as non-uniform wherein the operating temperatures of the temperature regions differ by an amount greater than the defined threshold. An exemplary threshold can be 10 mK. In various embodiments, the method 1000 can also comprise generating one or more recommendations in response to the temperature distribution being non-uniform. For example, the one or more recommendations can regard the re-positioning of one or more features in the subject quantum computing device layout to alter the temperature distribution.

FIG. 11 illustrates flow diagram of an example, non-limiting method 1100 that can facilitate determining a temperature distribution of one or more quantum computing device layouts in accordance with one or more embodiments described herein. Repetitive description of like elements employed in other embodiments described herein is omitted for sake of brevity.

At 1102, the method 1100 can comprise determining (e.g., via temperature estimation component 502), by a system 100 operatively coupled to one or more processors 120, at least one temperature achieved within a plurality of temperature regions based on a frequency shift exhibited by one or more superconducting resonators comprised within one or more quantum computing device layouts due to a change in kinetic inductance. For example, the frequency shift can be a function of an estimated frequency (e.g., represented herein by "$f_0$") of the one or more superconducting resonators at a reference temperature and a measured operating frequency (e.g. represented herein by "f") of the one or more superconducting resonators. For instance, the estimated frequency can be determined by simulating standard operating conditions of a quantum computing device using one or more PEC models and/or in accordance with Equations 1-3. In addition, the measured operating frequency can be characterized by Equations 4 and/or 5. Furthermore, the temperatures achieved within the temperature regions can be based on one or more operating temperatures of the one or more superconducting resonators, which in turn can be determined by the frequency shift (e.g., in accordance with Equations 5 and/or 6).

At 1104, the method 1100 can comprise generating (e.g., via map component 602), by the system 100, one or more maps based on the at least one temperature that can characterize a temperature distribution achieved during an operation of the one or more quantum computing device layouts. For example, the one or more maps can depict the one or more temperatures determined at 1102 superimposed onto the one or more quantum computing device layouts at within the corresponding temperature regions. For instance, the generating at 1104 can be performed in accordance with the various features described herein with regards to exemplary map 700.

FIG. 12 illustrates flow diagram of an example, non-limiting method 1200 that can facilitate determining a temperature distribution of one or more quantum computing device layouts in accordance with one or more embodiments described herein. Repetitive description of like elements employed in other embodiments described herein is omitted for sake of brevity.

At 1202, the method 1200 can comprise defining (e.g., via the region component 112), by a system 100 operatively coupled to one or more processors 120, a plurality of temperature regions from one or more quantum computing device layouts based on one or more positions of one or more superconducting resonators. As described herein, the one or more quantum computing device layouts can delineate the positioning, connectivity, and/or characteristics of one or more features of a quantum computing device (e.g., a superconducting quantum processor). In one or more embodiments, the one or more temperature regions can be defined based on the position and/or connectivity of one or more transmission lines of the one or more quantum computing device layouts (e.g., wherein the one or more transmission lines can be superconducting resonators). As described herein, the one or more temperature regions can be characterized by various sizes and/or shapes. For example, the defining at 1002 can be performed in accordance with the various features described herein with regard to the exemplary region generation process 200.

At 1204, the method 1200 can comprise determining (e.g., via simulation component 302), by the system 100, an estimated frequency (e.g., represented herein by "$f_0$") that can be exhibited by one or more superconducting resonators at a reference temperature. For example, the one or more superconducting resonators can be transmission lines, and/or the determining at 1204 can be performed in accordance with Equations 1-3. In various embodiments, the determining at 1204 can comprise simulating operation of the one or more superconducting resonators using one or more PEC models. Additionally, the reference temperature can be a temperature associated with a known kinetic inductance of the one or more superconducting resonators (e.g., a reference temperature of 0 K).

At 1206, the method 1200 can comprise measuring (e.g., via measurement component 402), by the system 100, an operating frequency (e.g. represented herein by "$f$") exhibited by the one or more superconducting resonators during the operation of the quantum computing device layout, wherein a function of the estimated frequency and the operating frequency is a frequency shift due to a change in kinetic inductance. For example, the operating frequency (e.g. represented herein by "$f$") can be characterized by Equation 4 and/or 5. One or more sensors and/or measurement technologies that can facilitate the measuring at 1006 can include, but are not limited to: network and/or vector analyzers ("VNA"), oscilloscopes, Raby interferometry, Ramsey interferometry, a combination thereof, and/or the like.

At 1208, the method 1200 can comprise determining (e.g., via temperature estimation component 502), by the system 100, at least one temperature that can be achieved within the plurality of temperature regions based on the frequency shift. For example, the operating temperature of the one or more superconducting resonators can be determined based on the estimated frequency and the measured operating frequency in accordance with Equations 6 and 7. Further, the operating temperature of the temperature regions can be determined based on the operating temperature of the one or more superconducting resonators. For example, the operating temperature of the temperature regions can be function of the operating temperatures of the total number of superconducting resonators comprised within the temperature regions.

At 1210, the method 1200 can comprise generating (e.g., via map component 602), by the system 100, one or more maps based on the at least one temperature determined at 1208 that can characterize a temperature distribution, which can be achieved during the operation of the one or more quantum computing device layouts. For example, the one or more maps can depict the one or more temperatures determined at 1102 superimposed onto the one or more quantum computing device layouts at within the corresponding temperature regions. For instance, the generating at 1210 can be performed in accordance with the various features described herein with regards to exemplary map 700.

At 1212, the method 1200 can comprise determining (e.g., via optimization component 802), by the system 100, whether the at least one temperature comprises a plurality of temperatures differing by less than or equal to a defined threshold. For example, the temperature distribution can be characterized as uniform wherein the operating temperatures of the temperature regions differ by less than or equal to a defined threshold. In another example, the temperature distribution can be characterized as non-uniform wherein the operating temperatures of the temperature regions differ by an amount greater than the defined threshold. An exemplary threshold can be 10 mK. In various embodiments, the method 1200 can also comprise generating one or more recommendations in response to the temperature distribution being non-uniform. For example, the one or more recommendations can regard the re-positioning of one or more features in the subject quantum computing device layout to alter the temperature distribution.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Repetitive description of like elements employed in other embodiments described herein is omitted for sake of brevity.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
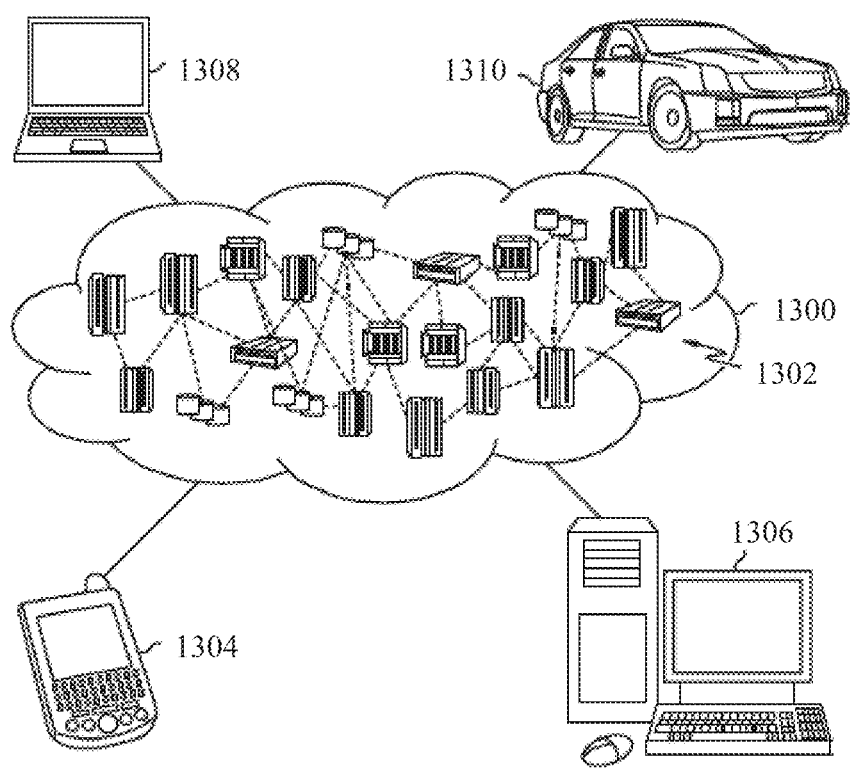
FIG. 13 depicts a cloud computing environment in accordance with one or more embodiments described herein.

Referring now to FIG. 13, illustrative cloud computing environment 1300 is depicted. As shown, cloud computing environment 1300 includes one or more cloud computing nodes 1302 with which local computing devices used by cloud consumers, such as, for example, personal digital assistant (PDA) or cellular telephone 1304, desktop computer 1306, laptop computer 1308, and/or automobile computer system 1310 may communicate. Nodes 1302 may communicate with one another. They may be grouped (not shown) physically or virtually, in one or more networks, such as Private, Community, Public, or Hybrid clouds as described hereinabove, or a combination thereof. This allows cloud computing environment 1300 to offer infrastructure, platforms and/or software as services for which a cloud consumer does not need to maintain resources on a local computing device. It is understood that the types of computing devices 1304-1310 shown in FIG. 13 are intended to be illustrative only and that computing nodes 1302 and cloud computing environment 1300 can communicate with any type of computerized device over any type of network and/or network addressable connection (e.g., using a web browser).

Figure 14:
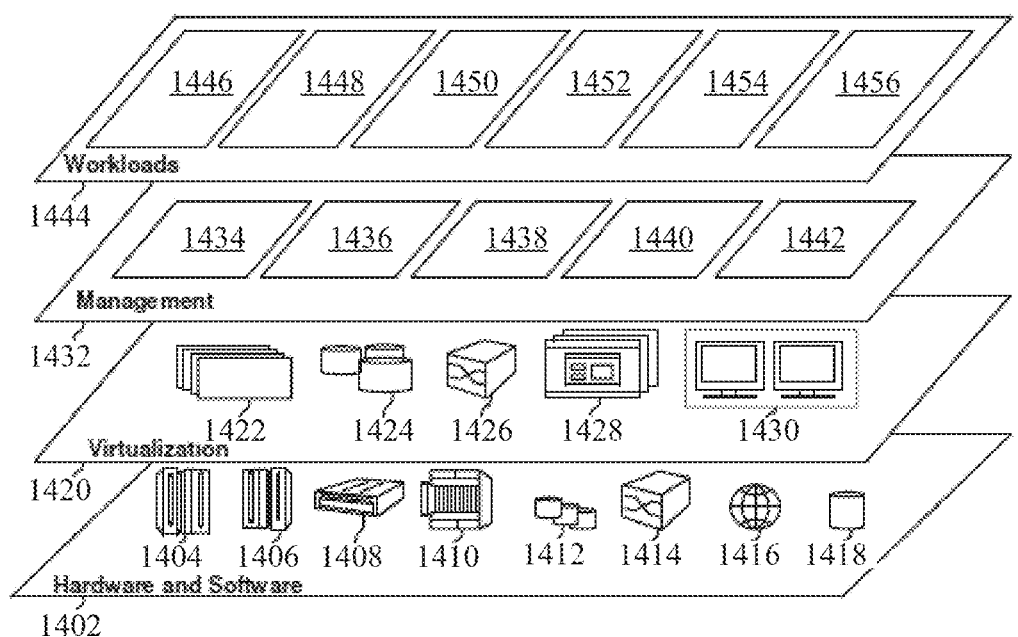
FIG. 14 depicts abstraction model layers in accordance with one or more embodiments described herein

Referring now to FIG. 14, a set of functional abstraction layers provided by cloud computing environment 1300 (FIG. 13) is shown. Repetitive description of like elements employed in other embodiments described herein is omitted for sake of brevity. It should be understood in advance that the components, layers, and functions shown in FIG. 14 are intended to be illustrative only and embodiments of the invention are not limited thereto. As depicted, the following layers and corresponding functions are provided.

Hardware and software layer 1402 includes hardware and software components. Examples of hardware components include: mainframes 1404; RISC (Reduced Instruction Set Computer) architecture based servers 1406; servers 1408; blade servers 1410; storage devices 1412; and networks and networking components 1414. In some embodiments, software components include network application server software 1416 and database software 1418.

Virtualization layer 1420 provides an abstraction layer from which the following examples of virtual entities may be provided: virtual servers 1422; virtual storage 1424; virtual networks 1426, including virtual private networks; virtual applications and operating systems 1428; and virtual clients 1430.

In one example, management layer 1432 may provide the functions described below. Resource provisioning 1434 provides dynamic procurement of computing resources and other resources that are utilized to perform tasks within the cloud computing environment. Metering and Pricing 1436 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1438 provides access to the cloud computing environment for consumers and system administrators. Service level management 1440 provides cloud computing resource allocation and management such that required service levels are met. Service Level Agreement (SLA) planning and fulfillment 1442 provide pre-arrangement for, and procurement of, cloud computing resources for which a future requirement is anticipated in accordance with an SLA.

Workloads layer 1444 provides examples of functionality for which the cloud computing environment may be utilized. Examples of workloads and functions which may be provided from this layer include: mapping and navigation 1446; software development and lifecycle management 1448; virtual classroom education delivery 1450; data analytics processing 1452; transaction processing 1454; and temperature distribution analysis 1456. Various embodiments of the present invention can utilize the cloud computing environment described with reference to FIGS. 13 and 14 to determine and/or analyze the temperature distribution that can be achieved during the operation of one or more quantum computing device layouts.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 15:
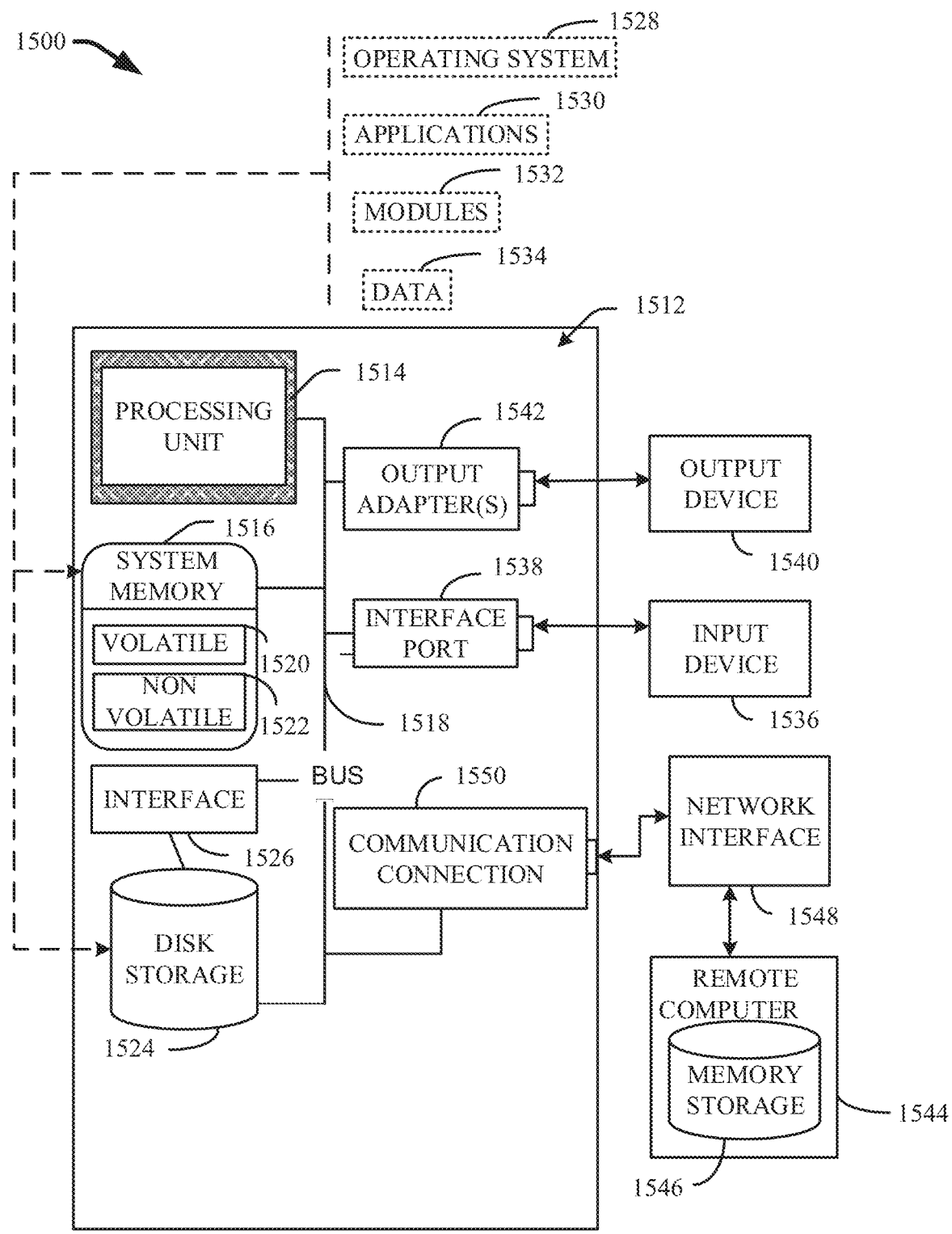
FIG. 15 illustrates a block diagram of an example, non-limiting operating environment in which one or more embodiments described herein can be facilitated.

In order to provide a context for the various aspects of the disclosed subject matter, FIG. 15 as well as the following discussion are intended to provide a general description of a suitable environment in which the various aspects of the disclosed subject matter can be implemented. FIG. 15 illustrates a block diagram of an example, non-limiting operating environment in which one or more embodiments described herein can be facilitated. Repetitive description of like elements employed in other embodiments described herein is omitted for sake of brevity. With reference to FIG. 15, a suitable operating environment 1500 for implementing various aspects of this disclosure can include a computer 1512. The computer 1512 can also include a processing unit 1514, a system memory 1516, and a system bus 1518. The system bus 1518 can operably couple system components including, but not limited to, the system memory 1516 to the processing unit 1514. The processing unit 1514 can be any of various available processors. Dual microprocessors and other multiprocessor architectures also can be employed as the processing unit 1514. The system bus 1518 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1516 can also include volatile memory 1520 and nonvolatile memory 1522. The basic input/output system (BIOS), containing the basic routines to transfer information between elements within the computer 1512, such as during start-up, can be stored in nonvolatile memory 1522. By way of illustration, and not limitation, nonvolatile memory 1522 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1520 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1512 can also include removable/non-removable, volatile/non-volatile computer storage media. FIG. 15 illustrates, for example, a disk storage 1524. Disk storage 1524 can also include, but is not limited to, devices like a magnetic disk drive, floppy disk drive, tape drive, Jaz drive, Zip drive, LS-100 drive, flash memory card, or memory stick. The disk storage 1524 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1524 to the system bus 1518, a removable or non-removable interface can be used, such as interface 1526. FIG. 15 also depicts software that can act as an intermediary between users and the basic computer resources described in the suitable operating environment 1500. Such software can also include, for example, an operating system 1528. Operating system 1528, which can be stored on disk storage 1524, acts to control and allocate resources of the computer 1512. System applications 1530 can take advantage of the management of resources by operating system 1528 through program modules 1532 and program data 1534, e.g., stored either in system memory 1516 or on disk storage 1524. It is to be appreciated that this disclosure can be implemented with various operating systems or combinations of operating systems. A user enters commands or information into the computer 1512 through one or more input devices 1536. Input devices 1536 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1514 through the system bus 1518 via one or more interface ports 1538. The one or more Interface ports 1538 can include, for example, a serial port, a parallel port, a game port, and a universal serial bus (USB). One or more output devices 1540 can use some of the same type of ports as input device 1536. Thus, for example, a USB port can be used to provide input to computer 1512, and to output information from computer 1512 to an output device 1540. Output adapter 1542 can be provided to illustrate that there are some output devices 1540 like monitors, speakers, and printers, among other output devices 1540, which require special adapters. The output adapters 1542 can include, by way of illustration and not limitation, video and sound cards that provide a means of connection between the output device 1540 and the system bus 1518. It should be noted that other devices and/or systems of devices provide both input and output capabilities such as one or more remote computers 1544.

Computer 1512 can operate in a networked environment using logical connections to one or more remote computers, such as remote computer 1544. The remote computer 1544 can be a computer, a server, a router, a network PC, a workstation, a microprocessor based appliance, a peer device or other common network node and the like, and typically can also include many or all of the elements described relative to computer 1512. For purposes of brevity, only a memory storage device 1546 is illustrated with remote computer 1544. Remote computer 1544 can be logically connected to computer 1512 through a network interface 1548 and then physically connected via communication connection 1550. Further, operation can be distributed across multiple (local and remote) systems. Network interface 1548 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1550 refers to the hardware/software employed to connect the network interface 1548 to the system bus 1518. While communication connection 1550 is shown for illustrative clarity inside computer 1512, it can also be external to computer 1512. The hardware/software for connection to the network interface 1548 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components;
a processor, operably coupled to the memory, and that executes the computer executable components stored in the memory, wherein the computer executable components comprise:
a region component that defines a plurality of temperature regions based on respective locations of superconducting resonators in a quantum computing device layout that represents a quantum computing device; and
a map component that generates a map that characterizes a temperature distribution by determining at least one temperature achieved within the plurality of temperature regions during an operation of the quantum computing device layout.

2. The system of claim 1, wherein respective temperature regions of the plurality of temperature regions comprise at least one superconducting resonator of the superconducting resonators.

3. The system of claim 1, further comprising:
a simulation component that determines an estimated frequency exhibited by a superconducting resonator of the quantum computing device layout at a reference temperature based on execution of a simulation of the quantum computing device using the quantum computing device layout; and
a measurement component that measures, using a sensor, an actual frequency exhibited by the superconducting resonator during an operation of the quantum computing device.

4. The system of claim 3, further comprising:
a temperature estimation component that determines the at least one temperature achieved within the plurality of temperature regions based on a defined relationship between the estimated frequency at the reference temperature and the actual frequency.

5. The system of claim 4, further comprising:
an optimization component that determines whether the at least one temperature comprises a plurality of temperatures differing by less than or equal to a defined threshold.

6. A system, comprising:
a memory that stores computer executable components;
a processor, operably coupled to the memory, and that executes the computer executable components stored in the memory, wherein the computer executable components comprise:
a temperature estimation component that determines at least one temperature achieved within a plurality of temperature regions of a quantum computing device layout based on a frequency shift exhibited by a superconducting resonator comprised within the quantum computing device layout due to a change in kinetic inductance, wherein the quantum computing device layout represents a quantum computing device; and
a map component that generates a map based on the at least one temperature that characterizes a temperature distribution achieved during an operation of the quantum computing device layout.

7. The system of claim 6, further comprising:
a region component that defines the plurality of temperature regions from the quantum computing device layout based on respective positions of superconducting resonators in the quantum computing device layout.

8. The system of claim 7, further comprising:
a simulation component that determines an estimated frequency exhibited by the superconducting resonator at a reference temperature based on execution of a simulation of the quantum computing device using the quantum computing device layout; and
a measurement component that measures, using a sensor, an actual frequency exhibited by the superconducting resonator during an operation of the quantum computing device, wherein the frequency shift is a function of the estimated frequency and the actual frequency.

9. The system of claim 8, further comprising:
an optimization component that determines whether the at least one temperature comprises a plurality of temperatures differing by less than or equal to a defined threshold.

10. A computer-implemented method, comprising:
defining, by a system operatively coupled to a processor, a plurality of temperature regions based on respective locations of superconducting resonators in a quantum computing device layout that represents a quantum computing device; and
generating, by the system, a map that characterizes a temperature distribution by determining at least one temperature achieved within the plurality of temperature regions during an operation of the quantum computing device layout.

11. The computer-implemented method of claim 10, wherein respective temperature regions of the plurality of temperature regions comprise at least one superconducting resonator of the superconducting resonators.

12. The computer-implemented method of claim 10, further comprising:
determining, by the system, an estimated frequency exhibited by a superconducting resonator of the quantum computing device layout at a reference temperature based on execution of a simulation of the quantum computing device using the quantum computing device layout; and
measuring, by the system, using a sensor, an operating frequency exhibited by the superconducting resonator during an operation of the quantum computing device.

13. The computer-implemented method of claim 12, wherein the determining the at least one temperature is facilitated by a defined relationship between the estimated frequency at the reference temperature and the operating frequency.

14. The computer-implemented method of claim 10, further comprising:
determining, by the system, whether the at least one temperature comprises a plurality of temperatures differing by less than or equal to a defined threshold.

15. The computer-implemented method of claim 14, wherein the at least one temperature comprises the plurality of temperatures differing by greater than a defined threshold, and wherein the computer-implemented method further comprises:
  recommending, by the system, a re-positioning of a feature of the quantum computing device layout to alter the temperature distribution.

16. A computer-implemented method, comprising:
  determining, by a system operatively coupled to a processor, at least one temperature achieved within a plurality of temperature regions of a quantum computing device layout based on a frequency shift exhibited by a superconducting resonator comprised within the quantum computing device layout due to a change in kinetic inductance, wherein the quantum computing device layout represents a quantum computing device; and
  generating, by the system, a map based on the at least one temperature that characterizes a temperature distribution achieved during an operation of the quantum computing device layout.

17. The computer-implemented method of claim 16, further comprising:
  defining, by the system, the plurality of temperature regions from the quantum computing device layout based on respective positions of superconducting resonators in the quantum computing device layout.

18. The computer-implemented method of claim 17, further comprising:
  determining, by the system, an estimated frequency exhibited by the superconducting resonator at a reference temperature based on execution of a simulation of the quantum computing device using the quantum computing device layout; and
  measuring, by the system, using a sensor, an operating frequency exhibited by the superconducting resonator during an operation of the quantum computing device, wherein the frequency shift is a function of the estimated frequency and the operating frequency.

19. The computer-implemented method of claim 18, further comprising:
  determining, by the system, whether the at least one temperature comprises a plurality of temperatures differing by less than or equal to a defined threshold.

20. The computer-implemented method of claim 19, further comprising:
  generating, by the system, a recommendation to reposition the superconducting resonator within the quantum computing device layout to alter the temperature distribution.

21. A computer program product for analyzing a temperature of a superconducting quantum processor, the computer program product comprising a computer readable storage medium having program instructions embodied therewith, the program instructions executable by a processor to cause the processor to:
  define, by a system operatively coupled to the processor, a plurality of temperature regions based on respective locations of superconducting resonators in a quantum computing device layout that represents the superconducting quantum processor; and
  generate, by the system, a map that characterizes a temperature distribution by determining at least one temperature achieved within the plurality of temperature regions during an operation of the quantum computing device layout.

22. The computer program product of claim 21, wherein respective temperature regions of the plurality of temperature regions comprise at least one superconducting resonator of the superconducting resonators.

23. The computer program product of claim 21, wherein the map is generated by a cloud computing environment.

24. The computer program product of claim 21, wherein the program instructions further cause the processor to:
  determine, by the system, an estimated frequency exhibited by a superconducting resonator of the quantum computing device layout at a reference temperature based on execution of a simulation of the quantum computing device using the quantum computing device layout; and
  measure, by the system, using a sensor, an operating frequency exhibited by the superconducting resonator during an operation of the quantum computing device.

25. The computer program product of claim 24, wherein the determining the at least one temperature is facilitated by a defined relationship between the estimated frequency at the reference temperature and the operating frequency.

* * * * *